US007531219B2

(12) United States Patent
Rubin et al.

(10) Patent No.: US 7,531,219 B2
(45) Date of Patent: May 12, 2009

(54) TREATED TEXTILE FABRIC

(75) Inventors: Craig A. Rubin, Franklin, MI (US);
Randy B. Rubin, Franklin, MI (US);
Jack L. Whistenant, Spartanburg, SC (US); James R. Isbell, Lake Wylie, SC (US)

(73) Assignee: Hi-Tex, Inc., West Bloomfield, MI (US)

( * ) Notice: Subject to any disclaimer, the term of this patent is extended or adjusted under 35 U.S.C. 154(b) by 568 days.

(21) Appl. No.: 11/186,558

(22) Filed: Jul. 21, 2005

(65) Prior Publication Data

US 2007/0021019 A1    Jan. 25, 2007

(51) Int. Cl.
*B05D 3/02* (2006.01)
(52) U.S. Cl. .................... 427/379; 427/381; 427/389.9; 427/392; 427/393.4; 427/394; 427/396; 427/412
(58) Field of Classification Search ................ 427/379, 427/381, 389.9, 392, 393.4, 394, 396, 412
See application file for complete search history.

(56) References Cited

U.S. PATENT DOCUMENTS

| 3,023,072 A | | 2/1962 | Dabrowski |
| 3,105,773 A | | 10/1963 | Frank et al. |
| 3,111,361 A | | 11/1963 | Fang |
| 3,238,010 A | | 3/1966 | Habib et al. |
| 3,256,230 A | | 6/1966 | Johnson, Jr. et al. |
| 3,262,128 A | * | 7/1966 | Thomas et al. .................. 2/227 |
| 3,326,713 A | | 6/1967 | Smith et al. |
| 3,419,533 A | | 12/1968 | Dieterich |
| 3,462,295 A | | 8/1969 | Elmquist et al. |
| 3,462,296 A | | 8/1969 | Raynolds et al. |
| 3,479,310 A | | 11/1969 | Dieterich |
| 3,503,915 A | | 3/1970 | Peterson |
| 3,521,993 A | | 7/1970 | Swidler et al. |
| 3,528,849 A | | 9/1970 | Vullo et al. |
| 3,535,156 A | | 10/1970 | Turner |
| 3,540,924 A | | 11/1970 | Rozek et al. |
| 3,544,663 A | | 12/1970 | Hamptschein et al. |
| 3,597,145 A | | 8/1971 | Marco |
| 3,607,493 A | | 9/1971 | Anderson |
| 3,645,989 A | | 2/1972 | Tandy, Jr. |
| 3,645,990 A | | 2/1972 | Raynolds |
| 3,649,344 A | | 3/1972 | Crabtree et al. |
| 3,652,198 A | | 3/1972 | Farber et al. |
| 3,713,878 A | | 1/1973 | Thomas |
| 3,773,545 A | | 11/1973 | Erb et al. |
| 3,922,399 A | | 11/1975 | Ochsner |
| 3,935,277 A | | 1/1976 | Dear et al. |
| 3,995,085 A | | 11/1976 | McCown |
| 4,007,305 A | | 2/1977 | Kakar et al. |
| 4,027,062 A | | 5/1977 | Engelbrecht et al. |
| 4,070,152 A | | 1/1978 | Pentz |
| 4,076,631 A | | 2/1978 | Caruso et al. |
| 4,107,055 A | | 8/1978 | Sukornick et al. |
| 4,108,814 A | | 8/1978 | Reiff et al. |
| 4,113,432 A | | 9/1978 | Otto |
| 4,118,526 A | * | 10/1978 | Gregorian et al. ............ 427/350 |
| 4,180,606 A | | 12/1979 | Hance et al. |
| 4,183,836 A | | 1/1980 | Wolfe, Jr. |
| 4,189,429 A | | 2/1980 | Lambert, Jr. |
| 4,203,883 A | | 5/1980 | Hangauer, Jr. |
| 4,208,173 A | | 6/1980 | Gregorian et al. |
| 4,219,602 A | | 8/1980 | Conklin |
| 4,230,753 A | | 10/1980 | Sheyon |
| 4,246,311 A | | 1/1981 | Hirst |
| 4,256,459 A | | 3/1981 | Russell et al. |
| 4,265,962 A | | 5/1981 | May |
| 4,290,846 A | | 9/1981 | Muntwyler |
| 4,336,300 A | | 6/1982 | Lorant et al. |
| 4,365,968 A | | 12/1982 | Gregorian et al. |
| 4,400,414 A | | 8/1983 | DeMott |
| 4,401,712 A | | 8/1983 | Morrison |
| 4,408,008 A | | 10/1983 | Markusch |
| 4,439,473 A | | 3/1984 | Lippman |
| 4,455,147 A | | 6/1984 | Lewis et al. |
| 4,467,013 A | | 8/1984 | Baldwin |
| 4,496,363 A | | 1/1985 | DeFilippi |
| 4,499,139 A | | 2/1985 | Schortmann |
| 4,504,517 A | * | 3/1985 | Hefele ........................ 427/465 |
| 4,507,413 A | | 3/1985 | Thoma et al. |
| 4,507,430 A | | 3/1985 | Shimada et al. |
| 4,518,649 A | | 5/1985 | Wang et al. |
| 4,594,286 A | | 6/1986 | McKinney et al. |
| 4,595,518 A | | 6/1986 | Raynolds et al. |
| 4,598,120 A | | 7/1986 | Thoma et al. |

(Continued)

FOREIGN PATENT DOCUMENTS

DE    32 31 062 A1    2/1984

(Continued)

OTHER PUBLICATIONS

John C. Tsirovasiles et al, *The Use of Water-Borne Urethane Polymers in Fabric Coatings*, J. Coated Fabrics (1986), Oct. 16, pp. 114-122.

(Continued)

*Primary Examiner*—Erma Cameron
(74) *Attorney, Agent, or Firm*—Brooks Kushman P.C.

(57) ABSTRACT

In at least one embodiment, the present invention relates to a stain resistant, water resistant and water repellant treated textile fabric that can be prepared by a) selecting an untreated textile fabric having a first side and a second side, b) topically treating the untreated fabric with an aqueous primary treatment composition comprising a fluorochemical textile treating agent, c) drying and curing the topically treated fabric to obtain a primarily treated fabric, d) securing at least one polymeric film to one side of the fabric, e) providing a polymeric coating on the polymeric film comprising an aqueous secondary treatment composition comprising a fluorochemical textile treating agent, f) applying flock onto the polymeric coating, and g) drying and curing the polymeric coating to obtain a secondary treated fabric.

10 Claims, No Drawings

U.S. PATENT DOCUMENTS

| | | | |
|---|---|---|---|
| 4,615,937 A | 10/1986 | Bouchette | |
| 4,619,854 A | 10/1986 | Penttinen | |
| 4,695,488 A | 9/1987 | Hisamoto et al. | |
| 4,713,068 A * | 12/1987 | Wang et al. | 604/366 |
| 4,721,511 A | 1/1988 | Kupits | |
| 4,740,398 A | 4/1988 | Bouchette | |
| 4,775,384 A | 10/1988 | Bachem et al. | |
| 4,795,675 A | 1/1989 | Dunn, Jr. et al. | |
| 4,808,466 A | 2/1989 | Kotani et al. | |
| 4,822,667 A | 4/1989 | Goad et al. | |
| 4,833,006 A | 5/1989 | McKinney et al. | |
| 4,835,019 A | 5/1989 | White et al. | |
| 4,837,079 A | 6/1989 | Quantrille et al. | |
| 4,844,952 A | 7/1989 | Korenkiewicz et al. | |
| 4,861,501 A | 8/1989 | Pfeifer | |
| 4,889,765 A | 12/1989 | Wallace | |
| 4,901,389 A | 2/1990 | Poulenard et al. | |
| 4,919,998 A | 4/1990 | Goad et al. | |
| 4,921,756 A | 5/1990 | Tolbert et al. | |
| 4,929,471 A | 5/1990 | Groelinger | |
| 4,971,835 A | 11/1990 | Munch et al. | |
| 4,996,099 A | 2/1991 | Cooke et al. | |
| 5,006,247 A | 4/1991 | Dennison et al. | |
| 5,009,667 A | 4/1991 | Beck et al. | |
| 5,019,422 A | 5/1991 | Rose et al. | |
| 5,034,266 A | 7/1991 | Kinlaw et al. | |
| 5,035,943 A | 7/1991 | Kinlaw et al. | |
| 5,091,243 A | 2/1992 | Tolbert et al. | |
| 5,108,836 A | 4/1992 | Ocampo et al. | |
| 5,126,138 A | 6/1992 | McGee et al. | |
| 5,177,141 A | 1/1993 | Thoma et al. | |
| 5,194,667 A | 3/1993 | Oxenrider et al. | |
| 5,196,080 A | 3/1993 | Mizobuchi et al. | |
| 5,262,444 A | 11/1993 | Rusincovitch et al. | |
| 5,306,764 A | 4/1994 | Chen | |
| 5,358,780 A | 10/1994 | Kafchinski et al. | |
| 5,399,419 A | 3/1995 | Porter et al. | |
| 5,545,451 A | 8/1996 | Haung et al. | |
| 5,565,265 A | 10/1996 | Rubin et al. | |
| 5,618,853 A | 4/1997 | Vonken et al. | |
| 5,747,392 A | 5/1998 | Xiao et al. | |
| 5,851,595 A | 12/1998 | Jones, Jr. | |
| 6,024,823 A | 2/2000 | Rubin et al. | |
| 6,165,920 A | 12/2000 | Rubin et al. | |
| 6,207,250 B1 | 3/2001 | Bullock et al. | |
| 6,251,210 B1 | 6/2001 | Bullock et al. | |
| 6,492,001 B1 | 12/2002 | Rubin et al. | |
| 6,541,138 B2 | 4/2003 | Rubin et al. | |
| 6,884,491 B2 | 4/2005 | Rubin et al. | |
| 2003/0008585 A1 | 1/2003 | Rubin et al. | |
| 2004/0018787 A1 | 1/2004 | Bullock et al. | |

FOREIGN PATENT DOCUMENTS

| | | |
|---|---|---|
| DE | 34 15 920 A1 | 11/1985 |
| DE | 38 36 030 A1 | 5/1990 |
| EP | 0 097 995 A2 | 1/1984 |
| EP | 0 383 310 A3 | 8/1990 |
| EP | 0 491 198 A1 | 6/1992 |
| EP | 0 525 671 A1 | 2/1993 |
| GB | 1 595 580 | 8/1981 |
| JP | 1-97274 | 4/1989 |
| JP | 3-195737 | 8/1991 |
| JP | 6-31845 | 2/1994 |
| JP | 6-108365 | 4/1994 |
| WO | WO 95/25843 | 9/1995 |
| WO | WO 99/50062 | 10/1999 |

OTHER PUBLICATIONS

Joseph W. Weinberg, *Performance and Application Advantages of Waterborne systems In The Automotive And Textile Industries*, J. Industrial Fabrics (1986) 4(4), pp. 29-38.

D. D. Gagliardi and Virginia Kenney, "Durable Antimicrobial Finishes for Textiles", Gagliardi Research Corp., East Greenwich, R. I., pp. 121-125, date unknown.

"A 400-Year-Old Collection of Italian Dyeing Recipes More Than Meets the Eye" By: Francis DL Gagliardi, Gagliardi Research Corp, East Greenwich, R.I., vol. 1, No. 25, Dec. 3, 1969, pp. 18-21.

"Cotton Finishing: Where it Stands, and What's Ahead" By: D. D. Gagliardi, Gagliardi Research Corp., East Greenwich, R. I., Textile World, Feb. 1962, Pges 86-97.

"Antibacterial Finishes", By: D. D. Gagliardi, Gagliardi Research Corp., East Greenwich, R. I., American Association of Textile Chemists and Colorists, Copyright 1962. No. 2, pp. 30-41.

PCT International Search Report, Nov. 6, 2007, International Application No. PCT/US06/25837, 2 Sheets.

* cited by examiner

TREATED TEXTILE FABRIC

BACKGROUND OF THE INVENTION

1. Field of the Invention

The present invention relates to treated textile fabric and to a method of treating a textile fabric. The present invention more particularly relates to a method of preparing a water resistant, water repellant, and stain resistant fabric, and to the textile fabric so prepared.

2. Background Art

Stain resistance, water repellency and water resistance are important in many uses of textile materials. In restaurants, for example, table cloths and seating upholstery often lack stain resistance and are subject to rapid liquid, i.e., water, penetration. These properties necessitate frequent cleaning and/or replacement of such items. Although one generally views microbial growth as being associated with fibers of biologic origin such as cotton, wool, linen and silk, in the field of marine use, the high relative humidity renders even synthetic polymer textiles, such as polyesters and polyamides, subject to microbial growth, which is also true of many other outdoor uses.

The term "water resistant" as used herein means essentially impermeable to liquids, such as water, i.e. treated textile fabric can support a considerable column of water without water penetration through the textile fabric. Such behavior is sometimes incorrectly termed "water repellant." However, the last term generally implies a lesser degree of water resistancy. Water repellency refers to the beading up and running off of water on a surface. Hydrophobicizing topical treatments are incapable of providing the necessary degree of water resistance as that term is used herein.

Textile fabrics may be made somewhat water repellant by various processes. For example, textile fabrics may first be scoured with a soap solution and then treated with a composition which may include zinc and calcium stearates as well as sodium soaps. The long chain carboxylic acid hydrophobic compounds provide a limited amount of water repellency. It is also possible to render fabrics somewhat liquid repellant by treating the fabric with commercially available silicone, for example poly(dimethylsiloxane)

To overcome problems associated with water absorption and stain resistance, resort has been made to synthetic leathers and polyvinylchloride (vinyl) coated fabrics. However, these fabrics do not have the hand or feel of cloth. Moreover, although attempts have been made to render such materials water vapor permeable, these attempts have met with only very limited success, as evidenced at least in part by the failure of synthetic leather to displace real leather in high quality seating and footwear.

Applications of relatively small amounts of fluorochemicals, such as the well known SCOTCHGUARD™ to textile fabrics and similar compounds, also may confer a limited degree of both water repellency and stain resistance to the textile fabric. However, these "SCOTCHGUARD™ed" textile fabrics are incapable of providing the degree of water repellency, water resistance, and stain resistance, as achieved by the present invention. Other methods of providing water repellant fabrics include coating the top surface of fabrics with thick polymeric coatings. These polymeric coatings, being on the top surface of the fabric, completely destroy the hand and feel of the fabric. Examples include vinyl boat covers, where the fabric backing is rendered water repellant by application of considerable quantities of polyvinylchloride latex or the thermoforming of a polyvinyl film onto the top of the fabric. The fabric no longer has the hand and feel of untreated fabric, but is plastic-like. Application of polyurethane films in the melt has also been practiced, with similar results. Moreover, unless aliphatic isocyanate-based polyurethanes are utilized, the coated fabric will rapidly weather.

The applicants of the present invention developed a treated fabric known as CRYPTON™ which is disclosed in U.S. Pat. Nos. 5,565,265 and 6,024,823. The Crypton™ fabric disclosed therein is liquid repellant, liquid resistant, stain resistant and antimicrobial. The Crypton™ fabric is prepared by topically treating a fabric with a first, relatively low viscosity, aqueous treatment composition comprising an antimicrobial agent and a substantial amount of fluorochemical treatment composition. After passing through the first bath, the fabric is dried and cured, and then a relatively high viscosity treatment composition is knife-coated on the backside of the fabric to further treat the fabric, which is then dried and cured again. This knife coat treatment can be done once, or more than once.

It would be desirable to provide a fabric that allows water vapor to pass through the fabric while prohibiting the passage of liquid. It would also be desirable to provide a method of producing a liquid repellant, liquid resistant, stain resistant fabric. It would further be desirable to provide a liquid repellant, liquid resistant, stain resistant fabric that retains its natural hand and texture, is easy to handle, and economical to produce. Moreover, it would be further desirable to provide a liquid repellant, liquid resistant, stain resistant fabric that can be made relatively cleanly and with relatively little expenditure of time and money.

SUMMARY OF THE INVENTION

In at least one embodiment, a stain resistant, water resistant and water repellant treated textile fabric is provided. In this embodiment, the fabric is prepared by a process which comprises selecting an untreated textile fabric having a first side and a second side, topically treating the untreated fabric with an aqueous primary treatment composition which comprises from 6 weight percent to 20 weight percent of a fluorochemical textile treating agent, based on the weight of the primary treatment composition, drying and curing the topically treated fabric at an elevated temperature to obtain a primarily treated fabric, securing at least one polymeric film to one side of the fabric, providing a polymeric coating on the polymeric film, with the polymeric coating comprising an aqueous secondary treatment composition comprising at least 2 weight percent of a fluorochemical textile treating agent, based on the weight of the secondary treatment composition, applying flock onto the polymeric coating, and drying and curing the polymeric coating to obtain a secondary treated fabric.

In at least another embodiment, the present invention provides a process for the preparation of a treated fabric. In this embodiment, the process comprises providing an untreated fabric, topically treating the untreated fabric with an aqueous treatment composition which comprises from 5 weight percent to 20 weight percent of a fluorochemical textile treating agent, based on the weight of the treatment composition, drying and curing the topically treated fabric at an elevated temperature to obtain a primarily treated fabric, securing a polymeric film to one side of the primarily treated fabric, providing a polymeric coating on the polymeric film, the polymeric coating comprising an aqueous secondary treatment composition comprising at least 2 weight percent of a fluorochemical textile treating agent, based on the weight of the secondary treatment composition, applying flock onto the polymeric coating, and drying and curing the polymeric coating to obtain a secondary treated fabric.

In at least yet another embodiment, the present invention provides a stain resistant, water resistant and water repellant treated textile fabric which comprises a textile fabric having a first side and a second side, first fluorochemical coat disposed over the fabric, the first fluorochemcial coat comprising the cured product of an aqueous primary treatment composition which comprises from 6 weight percent to 20 weight percent of a fluorochemical textile treating agent, based on the weight of the primary treatment composition, at least one polymeric film secured to one side of the fabric, a polymeric coat disposed over the polymeric film, the coat comprising the cured product of an aqueous secondary treatment composition comprising at least 2 weight percent of a fluorochemical textile treating agent, based on the weight of the secondary treatment composition, and a layer of flock disposed over the polymeric coat.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various alternative forms. Therefore, specific structural or functional details disclosed herein are not to be interpreted as limiting, but merely as a representative basis for the claims and/or a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and to normal grammatical variations of the initially defined abbreviation; and, unless expressly stated to the contrary, measurement of a property is determined by the same technique as previously or later referenced for the same property.

The water resistant, water repellant, stain resistant fabric of the present invention retains its natural "hand" or texture and is therefore aesthetically and texturally appealing. The fabric of the present invention is also durable, easy to handle and economical to produce.

The fabrics useful in the present invention include, but are not limited to, woven, non-woven and knitted fabrics, and preferably yarn or piece dyed upholstery woven fabrics, of natural fibers, synthetic fibers and mixtures of natural and synthetic fibers. Suitable natural fibers include, but are not limited to, fibers of cotton, linen, ramie, silk, wool and the like. Suitable synthetic fibers include, but are not limited to, fibers of nylon, polyester, acrylic, rayon, acetate and the like. Suitable fabrics for use with the present invention include, but are not limited to, jacquards (i.e., fabrics manufactured from a jacquard loom), brocades, dobbys (i.e., fabrics manufactured from a dobby loom), prints, poplins, cross-dyes, crepes, and canvases, non-wovens and knitted fabrics.

In at least one embodiment, the treating process of the subject invention involves, in a first step, treating the fabric with a penetrating aqueous primary treatment composition, hereinafter referred to as the primary treatment composition. In at least one embodiment, the primary treatment composition, in its most basic nature, comprises a substantial amount of a fluorochemical treating agent and water. The primary treatment composition may preferably include one or more antimicrobial agents, such as microbioicides and/or mildewcides. In at least one embodiment, the nature of the primary treatment composition is such that the fabric is thoroughly treated by topically treating the fabric, the primary treatment composition covering equally well both sides (i.e., surfaces) of the fabric as well as the surfaces of the fabric to cover the interstitial spaces within the fabric. In at least one embodiment, the fabric may then be oven dried and cured at elevated temperatures, for example, from 250° F. to 350° F. (121° C. to 177° C.), resulting in a primarily treated fabric. In at least one embodiment, the primarily treated fabric is stain resistant, water repellant, and water resistant. In addition, its tensile and tear strengths may be markedly improved. Yet, the primarily treated fabric is very difficult to distinguish from untreated fabric by hand, feel, texture, or ease of handling.

Although the process described above creates a unique new textile material, i.e., the primarily treated fabric, the primarily treated fabric may generally not be completely water resistant. Inspection of the primarily treated fabric against a light source can reveal multitudinous "pinholes" which may ultimately allow water to pass through the fabric. To at least assist in rendering the primarily treated fabric completely water resistant, in at least one embodiment, the primarily treated fabric undergoes a secondary treatment. In at least one embodiment, the secondary treatment comprises adhering at least one polymeric film to back side of the fabric, providing a polymeric coating on the polymeric film, wherein the polymeric coating comprises an aqueous secondary treatment composition comprising at least 2 weight percent of a fluorochemical textile treating agent, based on the weight of the secondary treatment composition, applying flock onto the polymeric coating, and drying and curing the polymeric coating to obtain a polymeric coat. The primarily treated fabric having one or more polymeric films, a polymeric coat, and a layer of flock adhered thereto results in a secondarily treated fabric.

More detailed description of embodiments of how to make and practice the present invention follows below. It should be understood that, with respect to the primary treatment composition, the term "weight percent," unless stated to the contrary, as used herein with respect to the components of the compositions of the present invention, refers to the total weight (i.e., the "wet weight") of the components of the compositions of the present invention and not to the weight percents of the solids or polymers (i.e., the "dry weight") in the components of the compositions of the present invention, unless otherwise specified.

In at least one embodiment, the process of treating fabric in accordance with the present invention involves the application of the primary treatment composition to the fabric. The application of the primary treatment composition is then followed by oven drying and curing, resulting in the primarily treated fabric.

In at least one embodiment, the primary treatment composition minimally contains a fluorochemical textile treating agent and water. In certain other embodiments, the primary treatment composition may further include antimicrobial agents, a crosslinking agent, a fire retardant and/or smoke suppressant, and other additives and auxiliaries such as dispersants, thickeners, dyes, pigments, ultraviolet light stabilizers, and the like. It would not depart from the spirit of the invention to include a minor amount of a dispersible polymer latex. However, the viscosity of the primary treatment composition in at least some embodiments should be low enough that thorough penetration of the fabric can be obtained.

In at least one embodiment, the fluorochemical textile treating agent is preferably a fluoroacrylate and comprises from 5 to 20 weight percent of the primary treatment composition, based on the weight of the primary treatment composition, in other embodiments from 6 to 12 weight percent, and in yet other embodiments 10 weight percent. The fluorochemicals provide water repellency, water resistance and stain resistance and may comprise unbranded generic fluoropolymers. Suitable fluorochemical treating agents include, but are not limited to, fluorine-containing polymers, such as the commercially available fluorochemical compositions SCOTCHGUARD™ FC 255, SCOTCHGUARD™ FC 214-230, available from 3M, and ZONYL™ RN, ZONYL™ 8070, and ZONYL™ 8787, available from E.I. Dupont de Nemours, and mixtures thereof. ZONYL™ 8070 is the most preferred fluorochemical treating agent for use in the treatment composition. The fluorochemical treating agent typically comprises from 5 to 45 weight percent solids, based on the weight of the fluorochemical treating agent, and preferably comprises from 10 to 35 weight percent solids, and most preferably comprises 25 weight percent solids. The amount of fluorochemical treating agent used in the primary treatment composition of the present invention is considerably higher than that traditionally used for treating upholstery fabric to render it stain resistant.

In at least one embodiment, an antimicrobial agent preferably comprises from 0.25 to 4 weight percent of the primary treatment composition, based on the weight of the primary treatment composition, and more preferably from 0.40 to 2 weight percent, and most preferably 0.60 weight percent. By "antimicrobial agent" it is meant any substance or combination of substances that kills or prevents the growth of a microorganism, and includes antibiotics, antifungal, antiviral and antialgal agents. In at least one embodiment, the most preferred antimicrobial agent is ULTRAFRESH™ DM-25, available from Thomas Research. Another preferred antimicrobial agent is Sanitized® Brand, available from Clariant Corporation. Other antimicrobials, particularly fungicides, may be used. Suitable examples include, but are not necessarily limited to, various tin compounds, particularly trialkyltin compounds such as tributyl tin oxide and tributyl tin acetate, copper compounds such as copper 8-quinolinolate, metal complexes of dehydroabietyl amine and 8-hydroxyquinolinium 2-ethylhexoate, copper naphthenate, copper oleate, and organosilicon quarternary ammonium compounds.

Crosslinking agents suitable for use in the primary treatment composition include resins which are themselves crosslinkable. Examples of suitable preferred self-crosslinking resins include, but are not necessarily limited to, the various melamine/formaldehyde and phenol/formaldehyde resins and their variants. Suitable examples include WT-50™, a product of the B.F. Goodrich Company and Astromel NW3A. In at least one preferred embodiment, the self-crosslinking agent is Astromel NW3A™, a product of Astro Industries, a division of Borden Chemical Company, of Morganton, N.C., which comprises 80 weight percent solids and 20 weight percent water. Suitable other self-crosslinking resins include, but are not necessarily limited to, phenol, melamine, urea, zirconium ammonium carbonate, carbodiimide, and polyfunctional aziridine and dicyandiamide based formaldehyde resins, which are available commercially, for example, from the Borden Chemical Company, of Columbus, Ohio. In at least one embodiment, the self-crosslinking agent is present in the primary treatment composition in an amount of from 0.1 to 3.0 weight percent, based on the weight of the primary treatment composition, and in another embodiment in an amount of less than 1.0 weight percent. In at least one embodiment, the self-crosslinking agent is Astromel NW3A™ and is present in the primary treatment composition in an amount of 0.25 weight percent, based on the weight of the primary treatment composition. Other crosslinkable resins such as oligomeric unsaturated polyesters, mixtures of polyacrylic acid and polyols, e.g. polyvinylalcohol, aliphatic and aromatic polyurethanes and epoxy resins may also be used, together with any necessary catalysts to ensure crosslinking during the oven drying cycle.

The primarily treated fabrics produced by the subject process can have flame retardants and/or smoke suppressants added to them to improve the flame retardency of the fabrics. Suitable flame retardants are known to those skilled in the art of fabric finishing, and include, for example, cyclic phosphorate esters such as Antiblaze™ NT available from Albermarle Corporation of Baton Rouge, La.

In at least one embodiment, the primary treatment composition is prepared by mixing the fluorochemical treating agent, and any other components, such as antimicrobial agent and crosslinking agent, in water until a uniform dispersion is obtained. In at least one embodiment, the water is present in the primary treatment composition in an amount of from 70 to 95 weight percent, based on the weight of the primary treatment composition, in another embodiment from 80 to 90 weight percent, and in yet another embodiment 84 to 89 weight percent.

The fabric to be primarily treated may be drawn through a bath of the treatment composition by any convenient method, or the treatment composition may be sprayed or rolled onto the fabric. In at least one embodiment, the fabric, previously scoured to remove textile yarn finishes, soaps, etc., is drawn through a bath of the primary treatment composition, as the primary treatment composition should uniformly coat both surfaces of the fabric as well as its interior. The fabric, after being drawn through a bath of the treatment composition, may be passed through nips or nip rollers to facilitate a more thorough penetration of the primary treatment composition into the fabric and/or to adjust the amount of the primary treatment composition relative to the fabric (i.e. wet pickup). By such or other equivalent means, the wet pickup is adjusted, in at least one embodiment, to provide from 30 to 200 weight percent wet pickup relative to the weight of the untreated fabric, in another embodiment from 60 to 150 weight percent, and in yet another embodiment from 80 to 120 weight percent. In at least one embodiment, a 100 weight percent addition of primary treatment composition relative to the weight of the untreated fabric is considered optimal with, normal treatment composition solids content.

In at least one embodiment, the coated fabric is then passed through an oven maintained at an elevated temperature, preferably from 250° F. to 350° F. (121° C. to 277° C.) for a period of time sufficient to cure the applied primary treatment composition. By the term "cure", as used in the previous sentence, it is meant to dry the applied primary treatment composition to perform any necessary crosslinking of the components of the primary treatment composition. Generally, a period of from 1 to 8 minutes, preferably 2 minutes at 325° F. (163° C.) is sufficient.

The primarily treated fabric of the subject invention has a number of advantageous and unique characteristics. In at least one embodiment, it is highly, although not totally, water resistant, as well as being water repellant and stain resistant. While being highly water resistant, the primarily treated fabric can allow ready passage of water vapor, and is thus eminently suited for items such as boat covers, which have traditionally been made of vinyl top coated fabrics. The vinyl top coated fabrics are substantially water vapor impermeable, and contribute to mildew formulation in boats using such covers. The primarily treated fabric has substantially the same hand, feel, texture, and drape of uncoated fabric, and thus can be manipulated by traditional manufacturing techniques as well as being aesthetically pleasing. The primarily treated fabric is also considerably more resistant to tear and opening at needle holes, as well as having higher tensile strength.

In at least one embodiment, to render the fabric more completely water resistant, the fabric undergoes a secondary treatment. In at least one embodiment, the first step of the secondary treatment comprises adhering one or more polymeric films to the back of the primarily treated fabric, depending on the degree of water resistancy desired. The adherence of one or more polymeric films to the back of the primarily treated fabric is designed to help render the fabric virtually totally water resistant. The polymeric film being adhered to the back of the fabric does not appreciably interfere with the hand and feel of the fabric. Moreover, the adherence of the polymeric film to the back of the fabric does not interfere with the aesthetic qualities of the fabric as the polymeric film is generally hidden from view (i.e., facing away) during its preferred use, such as seating upholstery, curtains, car and boat covers, mattress covers, etc.

The polymeric film can be any film formed by any fabrication technique known in the art, and may preferably be an extruded or cast film. The thickness of the polymeric film will generally range from 0.5 mils (0.013 mm.) to 10 mils (0.26 mm.) although thinner, as well as thicker, films can be used, if desired.

The polymeric film may be made of any polymer, copolymer, blend, and the like, of polymeric material. Such polymeric materials can include, for example, and not by way of limitation, thermosetting and thermoplastic materials such as polyvinyl chloride, polyesters, polyamides, polysulfones, polyolefins, such as polyethylene and polypropylene, polychloroprene (neoprene), polystyrene, polymethylstyrene, polyethylene terephthalate, polyisoprene, polyvinyl acetate, polyvinylidene chloride, aliphatic and aromatic urethanes, and blends thereof and coextrusions thereof. Other film forming materials will be obvious to those skilled in the art and are intended to be covered in the scope of the compositions, articles, and processes of the present invention.

The polymeric film can be adhered to the back of the fabric by any technique known in the art. One suitable technique in which the polymeric film can be adhered to the back of the fabric is employing the use of a thin suitable intermediate hot-melt adhesive layer (i.e., film of web) between the polymeric film and the fabric.

The intermediate hot-melt adhesive layer can be laminated between the fabric and the polymeric film by any known technique. The polymeric film is generally supplied from a roll of preformed polymeric film and a thin layer of hot-melt adhesive is melted between the fabric and polymeric film. The hot-melt adhesive is applied usually in an amount in the range of from 0.25 to 3 oz/yd$^2$ (9 to 100 g/m.$^2$) depending upon the adhesive although, less or more adhesive could be used, if desired. The adhesive, after being heated, is then be allowed to cool, preferably at room temperature, to secure the polymeric film to the fabric.

Suitable hot-melt adhesives include, but are not limited to, hot-melt adhesives comprising at least one polyamide, polyester, polyolefin, polyurethane and combinations thereof. It should be noted that a bi-component film could be used to simplify the securing of a polymeric film to the fabric. In a bi-component film, the hot-melt adhesive is provided preformed on one side of a polymeric film.

Adhesives other than hot-melt adhesives (such as liquid adhesives) can also be used. Suitable liquid adhesives for use are well known in the art. Some examples include plastisol, epoxy, acrylic, organosol and urethane adhesives. The liquid adhesives can be applied to the polymeric film by known coating techniques (gravure cylinder, knife, roller, reverse roller, anilox roller etc.), laminated under heat between the film and the fabric and allowed to cool to secure the film to the fabric. Plastisols are one of the best known liquid adhesive materials. These are dispersions of finely divided polymeric materials in nonvolatile organic liquids and low melting solids, generally referred to as plasticizers. Suitable plasticizers include phthalate, adipate and sebaccate esters and polyols such as ethylene glycol and its derivatives. A typical plastisol composition is between 50 to 95 parts polymeric material and 5 to 50 parts plasticizer. After the plastisol is deposited on the polymeric film, the film and the fabric are married (i.e., brought into contact with each other) so that the plastisol is disposed therebetween. Heat is then supplied to raise the temperature of the plastisol from 300° F. to 400° F. to form a solid layer of PVC adhesive between the polymeric film and the fabric.

Another suitable technique in which the polymeric film can be adhered to the back of the fabric is to directly attach the polymeric film to the fabric without the use of an intermediate adhesive layer. This can be done in any suitable manner known in the art. Examples of suitable techniques include direct calender lamination and extrusion lamination. These techniques can produce a composite article without the use of an intermediate adhesive layer. In these fabrication techniques, the polymeric film acts as the adhesive because it is brought in contact with the fabric shortly after formation before the polymeric film completely cools. A mechanical bond forms between the fabric and the polymeric film when the polymeric film cools.

In direct calender lamination, the polymeric material is squeezed between two rollers to form a polymeric film. The fabric is fed off of another roller so that the fabric passes directly under the calendered polymeric film to receive the calendered polymeric film before the polymeric film completely cools. The fabric and its polymeric film can then be fed through pressure rollers to facilitate a more thorough penetration of the polymeric film into the fabric. A mechanical bond forms between the fabric and polymeric film when the film cools thereby securing the film to the fabric. The fabric and film can then be taken up on a roll.

Direct extrusion lamination is somewhat similar to direct calendar lamination. The main difference is that, in direct extrusion lamination, the polymeric film is extruded through a die onto the fabric, rather than being calendered onto the fabric.

Another suitable technique in which the fabric can be coupled with a polymeric film is to deposit, a plastisol or a similar material, such as organosol, onto the fabric and then to cure the deposited plastisol material to form a polymeric film adhered to the fabric. Depositing plastisol material directly onto the fabric works best when the fabric is relatively smooth. For relatively course fabrics, the plastisol material may first be deposited on a smooth carrier surface, such as a silicone release paper, and then be transferred to the fabric after the plastisol begins to gel, but before solidifying.

It is preferred that the primary treatment precede the application of the polymeric film(s) to the fabrics. However, the polymeric film(s) could be adhered to the fabric before the primary treatment or polymeric film(s) could first be adhered to the fabric, followed by the primary treatment, which could then be followed by adhering addition polymeric film(s) to the previously adhered polymeric film(s).

In at least one embodiment, after the polymeric film(s) has been adhered to the primarily treated fabric, the secondary treatment process further comprises the application of one or more additional coating steps, or secondary treatments, to the polymeric film, depending on the degree of water repellency desired. The secondary treatments, if more than one is applied, are the same, and involve, in at least one embodiment, the application of a secondary treatment composition which minimally comprises, in its most basic nature, a polymeric latex and a fluorochemical treating agent. The secondary treatment composition may also contain one or more antimicrobial agents, such as microbicidides and/or mildewcides. In at least certain embodiments, the secondary treatment composition preferably has a viscosity, at room temperature, of from 25,000 cps to 60,000 cps, and more preferably from 30,000 cps to 50,000 cps, and most preferably from 35,000 cps to 45,000 cps. Moreover, in at least certain embodiments, the secondary treatment composition preferably comprises from 30 to 70 weight percent solids, based on the weight of the secondary treatment composition, and more preferably from 40 to 60 weight percent solids, and most preferably from 40 to 50 weight percent solids.

In at least one embodiment, the secondary treatment composition is applied to the polymeric film on the primarily treated fabric. The secondary treatment composition, which in at least one embodiment preferably has a consistency that is similar to that of wallpaper paste or high solids wood glue, is rolled, sprayed, or otherwise applied to the polymeric film on the primarily treated fabric which then passes under a knife blade, doctor blade, or roller that essentially contacts the primarily treated fabric surface, leaving a thin coating of 1-5 $oz/yd^2$, and preferably 1.5 $oz/yd^2$, of material.

In at least one embodiment, the secondary treatment composition minimally comprises a copolymeric latex and fluorochemical textile treatment agent. The secondary treatment composition may also preferably contain one or more antimicrobial agents. In at least one embodiment, the secondary treatment composition comprises from 30 to 70 weight percent solids, based on the weight of the secondary treatment composition, and in another embodiment from 40 to 60 weight percent solids, and in yet another embodiment from 40 to 50 weight percent solids.

In at least one embodiment, the secondary treatment composition contains from 2 to 20 weight percent, of a fluorochemical textile treating agent, based on the weight of the secondary treatment composition, and in another embodiment 3 to 15 weight percent, and in yet another embodiment 4 to 10 weight percent. Fluorochemical treatment agents suitable for use with the secondary treatment composition include, but are not limited to, the fluorochemical treatment agents suitable for use with the primary treatment compositions. In at least one embodiment, TEFLON® RN is the most preferred fluorochemical treating agent for use in the secondary treatment composition. It is noteworthy that the amount of fluorochemical treating agent used in the secondary treatment composition is considerably higher than amounts traditionally used for treating upholstery fabric to render it stain resistant.

In at least one embodiment, the copolymer of the copolymer latex of the secondary treatment composition has a glass transition temperature of 0° C. or lower, in other embodiments of −10° C. or lower, and in yet other embodiments within the range of −40° C. to −10° C. In at least one embodiment, the copolymer is a styrene/acrylate copolymer. In at least certain embodiments, the most preferred copolymer latex is the styrene/acrylate copolymer latex CA-2091 FT, a copolymer latex comprising 50 weight percent solids which is available from Cybertech of Greenville, S.C. In at least one embodiment, the secondary treatment composition preferably contains from 30 to 90 weight percent copolymer latex, based on the weight of secondary treatment composition, in another embodiment, from 50 to 85 weight percent, in yet another embodiment 65 to 80 weight percent, and in still yet another embodiment 75 weight percent. In at least one embodiment, the copolymer latex comprises from 30 to 70 weight percent solids, based on the weight of the copolymer latex, in another embodiment from 40 to 60 weight percent solids, and in yet another embodiment 50 weight percent solids.

In at least one embodiment, thickeners are generally necessary to adjust the rheological properties of the secondary treatment composition. Such thickeners are well known, and include, but are not necessarily limited to, water soluble, generally high molecular weight natural and synthetic materials, particularly the latter. Examples of natural thickeners include, but are not necessarily limited to, the various water soluble gums such as gum acacia, gum tragacanth guar gum, and the like. In certain embodiments, more preferred are the chemically modified celluloses and starches, such as methylcellulose, hydroxymethylcellulose, propylcellulose, and the like. In certain other embodiments, most preferred are high molecular weight synthetic polymers such as polyacrylic acid; copolymers of acrylic acid with minor amounts of copolymerizable monomers such as methyl acrylate, methacrylic acid, acrylonitrile, vinylacetate, and the like, as well as the salts of these compounds with alkali metal ions or ammonium ions; polyvinylalcohol and partially hydrolyzed polyvinylacetate; polyacrylamide; polyoxyethylene glycol; and the so-called associative thickeners such as the long chain alkylene oxide capped polyoxyethylene glycols and polyols or their copolymer polyoxyethylene/polyoxypropylene analogues. The length of the carbon chain of the long chain alkylene oxide in associative thickeners has a great effect on the thickening efficiency, with alkylene residues of 8-30 carbon atoms, preferably 14-24 carbon atoms having great thickening efficiency. In at least one embodiment, the thickeners are used in amounts up to 4 weight percent, and in other embodiments up to 2 weight percent or less. In at least one embodiment the thickener solids are water soluble in the amounts used.

Some preferred acrylic thickeners for use with at least one embodiment of the secondary treatment composition are JATHIX 175™, which in one embodiment is present in the secondary treatment composition in an amount of 8 weight percent, based on the weight of the secondary treatment composition, and ACRYLSOL ASE-60 and ASE-95, which is available from the Rohm and Haas Co., of Philadelphia, Pa. and in at least one embodiment is present in the secondary treatment composition in an amount of 1 weight percent, based on the weight of the second treatment composition. In at least one embodiment the thickener may be used in amounts up to 20 weight percent, based on the weight of the secondary treatment composition, and in another embodiment from 6 weight percent to 12 weight percent, and in yet another embodiment 10 weight percent or less. In at least one embodiment, the thickener solids are water soluble in the amounts used.

In at least one embodiment, the secondary treatment composition may also include one or more antimicrobial agents in an amount of from 0.1 to 2 weight percent, based on the weight of the secondary treatment composition, and in another embodiment from 0.2 to 1 weight percent, and in yet another embodiment 0.4 weight percent. Antimicrobial agents suitable for use with the secondary treatment composition include, but are not limited to, the antimicrobial agents suitable for use with the primary treatment composition. In at least one embodiment, the secondary treatment composition contains 0.2 weight percent, based on the weight of the secondary treatment composition, each of ULTRAFRESH™ DM-25 available from Thompson Research and Sanitized® Brand available from Clariant Corporation.

In at least one embodiment, the secondary treatment composition may also include a pH adjuster. Suitable pH adjusters include, but are not necessarily limited to, ammonium compositions such as ammonium hydroxide and zinc ammonium carbonate. When a pH adjuster is used in the secondary treatment composition, it is preferred in at least one embodiment that it be present in the secondary treatment composition in an amount of no more than 5 weight percent, based on the weight of the secondary treatment composition. In at least another embodiment, the pH adjuster is present in the secondary treatment composition in an amount of less than 2.5 weight percent, based on the weight of the secondary treatment composition. In at least one embodiment, the pH adjuster is ammonium hydroxide and is present in the secondary treatment composition in an amount of 1.8 weight percent, based on the weight of the secondary treatment composition. Addition of pH adjusters may augment the thickening ability of any thickeners.

In at least one embodiment, the secondary treatment composition may also include a crosslinking catalyst. Suitable catalysts include, but are not necessarily limited to, zirconium acetate, zinc ammonium carbonate, ammonium chloride, ammonium nitrate and para-toluene sulfonic acid. When a catalyst is used in the secondary treatment composition, it is preferred in at least one embodiment that it be present in the secondary treatment composition in an amount of no more than 5 weight percent, based on the weight of the secondary treatment composition. In at least another embodiment, the catalyst is present in the secondary treatment composition in an amount of from 0.5 to 2 weight percent, based on the weight of the secondary treatment composition. In at least one embodiment, the catalyst is BACOTE 20, a zirconium ammonium carbonate catalyst, and is present in the secondary treatment composition in an amount of 0.75 weight percent, based on the weight of the secondary treatment composition.

In at least one embodiment, the secondary treatment composition may also include a self-crosslinking resin. Suitable self-crosslinking resins include, but are not necessarily limited to, the self-crosslinking resins useable with the primary treatment composition. When a self-crosslinking resin is used in the secondary treatment composition, it is preferred in at least one embodiment that it be present in the secondary treatment composition in an amount of no more than 5 weight percent, based on the weight of the secondary treatment composition. In at least another embodiment, the self-crosslinking resin is present in the secondary treatment composition in an amount of from 0.5 to 2 weight percent, based on the weight of the secondary treatment composition. In at least one embodiment, the self-crosslinking resin in the secondary treatment composition is melamine/formaldehyde resin and is present in the secondary treatment composition in an amount of 1.8 weight percent, based on the weight of the secondary treatment composition.

In at least one embodiment, the secondary treatment composition may also include a detackifying wax to detackify the finish of the secondarily treated fabric. Suitable detackifying waxes include any suitable waxes which are capable of detackifying the finish of the fabric of the present invention, such as paraffin wax, zirconium wax and microcrystalline waxes. In at least one embodiment, the detackifying wax is present in the secondary treatment composition in the form of an aqueous wax emulsion containing from 35 to 70 weight percent wax, based on the weight of the wax emulsion. When a detackifying wax emulsion is used in the secondary treatment composition, it is preferred in at least one embodiment that it be present in the secondary treatment composition in an amount of no more than 15 weight percent, based on the weight of the secondary treatment composition. In at least another embodiment, the detackifying wax emulsion is present in the secondary treatment composition in an amount of 3 to 8 weight percent, based on the weight of the secondary treatment composition. In at least one embodiment, the detackifying wax emulsion is a paraffin wax emulsion, comprising 50 weight percent solids, and is available from Tiarco, Inc. of Dalton, Ga., and is present in the secondary treatment composition in an amount of 4 weight percent, based on the weight of the secondary treatment composition.

Flame retardants which are dispersible may be added to the secondary treatment composition in the place of or in addition to those previously described with respect to the primary treatment composition. An example is Caliban™ P-44, containing decabromodiphenyloxide and antimony oxide available from White Chemical Company. A suitable smoke suppressant is zinc borate, which may be used in the amount of 2 weight percent based on solids.

The order of mixing the components of the secondary treatment composition is not very critical. In general, the components are added to the copolymer latex in any order, with thickeners usually being added last. The mixture is stirred until a uniform composition is obtained. In at least one embodiment, the resulting composition is considerably more viscous than the primary treatment composition, and has a consistency similar to that of PVA wood glue or wallpaper paste. It will be appreciated that the secondary treatment composition could further include other additives and auxiliaries such as dispersants, dyes, pigments, ultraviolet light absorbers, and the like.

The amount of the secondary treatment composition applied may vary. In at least one embodiment, a doctor blade or knife edge is adjusted to touch or nearly touch the polymeric film as the fabric, coated with the composition, passes by. Other techniques that could be employed to apply the secondary treatment composition may be kissed-rolled and rotary screen. Although the coating may preferably be in at least one embodiment as much as 1 mm thick above the polymeric film, it is more preferred in at least another embodiment that the wet surface of the coating be at substantially the height of the uppermost yarns of the fabric. When subsequently dried, the thickness of the coating will, of course, be considerably reduced.

In at least one embodiment, the secondary treatment composition coating is then coated with a layer of flock before being fully cured. The flock coating can be applied in any suitable manner. It at least one embodiment, 0.25 to 1.5 oz/yd$^2$ of flocking is applied over the secondary treatment composition coating. In at least one embodiment, the flock is a cellulose flock of a suitable size (such as 100 microns) and can be applied using a flocker sifting through a screen of suitable opening size (such as 200 microns). In at least certain embodiments, the layer of flock helps to provide a relatively soft hand and feel to the fabric and can allow for a non-tacky finish without the use of a detackifyer filler.

Following the flocking treatment, in at least one embodiment, the fabric is then dried in any suitable manner, and preferably oven dried at 250° F. to 350° F. (121° C. to 277° C.), resulting in a secondarily treated fabric. As a result of the primary and secondary treatments, the weight of the finished fabric will have increased in at least one embodiment by from 5% to 200%, in another embodiment from 10% to 90%, and in another embodiment from 8% to 20%.

As mentioned above, the fabric of the present invention is durable, easy to handle and economical to produce. Because the fabric of the present invention retains its "hand" or texture (i.e., does not feel like plastic), the fabric is easy to sew and seams are less noticeable, and more durable. For example, when vinyl is sewed, the needle holes tend to open when the vinyl is stretched. With the fabric of the present invention, needle holes do not tend to open and thus the seams are stronger and less noticeable. Moreover, while the fabric of the present invention provides a moisture barrier, it is believed that vapors are allowed to pass through the fabric. Human skin which may come in contact with the fabric of the present invention, for example in upholstery applications, is therefore less likely to perspire. The fabric of the present invention may also be transfer printed.

The following Specific non-limiting Example further describes the present invention.

EXAMPLE

A previously dyed jacquard fabric is immersed into a bath of primary treatment composition containing 8.0 weight percent ZONYL™ 8070 fluorochemical, and 0.6 weight percent of Sanitized® T96-23 biocide, and 91.4 weight percent water.

The primary treatment composition is prepared by first adding to a mixture of the WT-50™ resin and the Ultrafresh™ DM-25 to the water. The ZONYL™ 8070 is then added to the water mixture (i.e., the water, WT-50™ and the Ultrafresh™ D-25). Each of the components are added while agitating the mixture.

The treated fabric is passed through nip rolls whose pressure is adjusted to provide for 100% primary treatment composition pickup. The fabric is then dried by passage through a drying oven. The resulting treated fabric displays virtually no change in color, is able to support a considerable column of water, indicating good water resistancy, and is stain resistant. The resulting fabric is water vapor permeable, and has excellent hand, feel, and texture. The tear strength and tensile strength are considerably improved relative to the untreated fabric. Examination of the treated fabric against a strong light showed the presence of numerous pinholes.

The primarily treated fabric, when viewed against a strong light, exhibits numerous pinholes, but is substantially water resistant, water repellant and stain resistant. The primarily treated fabric then has a hot melt polymeric film adhered to its back side.

The polymeric film is then coated with a secondary treatment composition containing 75 pounds of a 50 weight percent solids latex identified as CA-2091 FT available from Cybertech in Greenville, S.C., 2 pounds of WT-5—melamine/formaldehyde resin available from B. F. Goodrich, 4 pounds Teflon RN fluorochemical, 2 pounds aqueous ammonia, 0.60 pounds UltraFresh 15, 7 pounds Acrysol ASE-95, 2 pounds Acrysol ASE-60 and 7.4 pounds of additional water.

The fabric is passed under a knife blade that presses the secondary treatment composition onto the back side of the fabric, adhering it to the hot melt polymeric film, coated with a layer of flock, dried and cured at 300 degrees F. (149 degrees C.).

The resulting fabric is virtually totally water resistant, supporting a higher column of water than the same fabric after treatment with the primary treatment composition only. Moreover, examination under a strong light shows evidence of no pinholes. The fabric has excellent hand and feel, although it is somewhat stiffer than the virgin fabric. The fabric has the appearance and feel of fabric, not of plastic.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the specification and following claims.

What is claimed is:

1. A process for the preparation of a treated fabric, the process comprising:
   a) providing an untreated fabric;
   b) topically treating the untreated fabric with an aqueous treatment composition comprising:
      b)i) from 5 weight percent to 20 weight percent of a fluorochemical textile treating agent, based on the weight of the treatment composition;
   c) drying and curing the topically treated fabric to obtain a primarily treated fabric;
   d) securing a polymeric film via a mechanical or adhesive bond to one side of the primarily treated fabric;
   e) providing a polymeric coating on the polymeric film, the polymeric coating comprising an aqueous secondary treatment composition, the secondary treatment composition comprising at least 2 weight percent of a fluorochemical textile treating agent, based on the weight of the secondary treatment composition;
   f) applying flock onto the polymeric coating; and
   g) drying and curing the polymeric coating to obtain a secondary treated fabric.

2. The process of claim 1 wherein the polymeric film is secured to the fabric after (c) obtaining a primarily treated fabric.

3. The process of claim 1 wherein the step of drying and curing the polymeric coating to obtain a secondary treated fabric takes place after the step of applying flock onto the polymeric coating.

4. The process of claim 1 wherein the primarily treated fabric has a front side and a back side and the polymeric film is secured to the back side of the fabric such that, when the fabric is in use, the polymeric film faces away from view.

5. The process of claim 1 wherein an adhesive is provided to secure the polymeric film to the fabric.

6. The process of claim 1 wherein a mechanical bond between the polymeric film and the fabric secures the film to the fabric.

7. The process of claim 1 wherein the primary treatment composition further comprises from 0.25 weight percent to 4 weight percent of an antimicrobial agent, based on the weight of the primary treatment composition.

8. The process of claim 7 wherein the primary treatment composition further comprises a crosslinkable resin in an amount of from 0.1 weight percent to 3 weight percent, based on the weight of the primary treatment composition.

9. The process of claim 8 wherein the crosslinkable resin comprises a melamine/formaldehyde resin.

10. The process of claim 8 wherein the primary treatment composition further comprises water in an amount of from 70 weight percent to 95 weight percent, based on the weight of the primary treatment composition.

* * * * *